Figure 1:
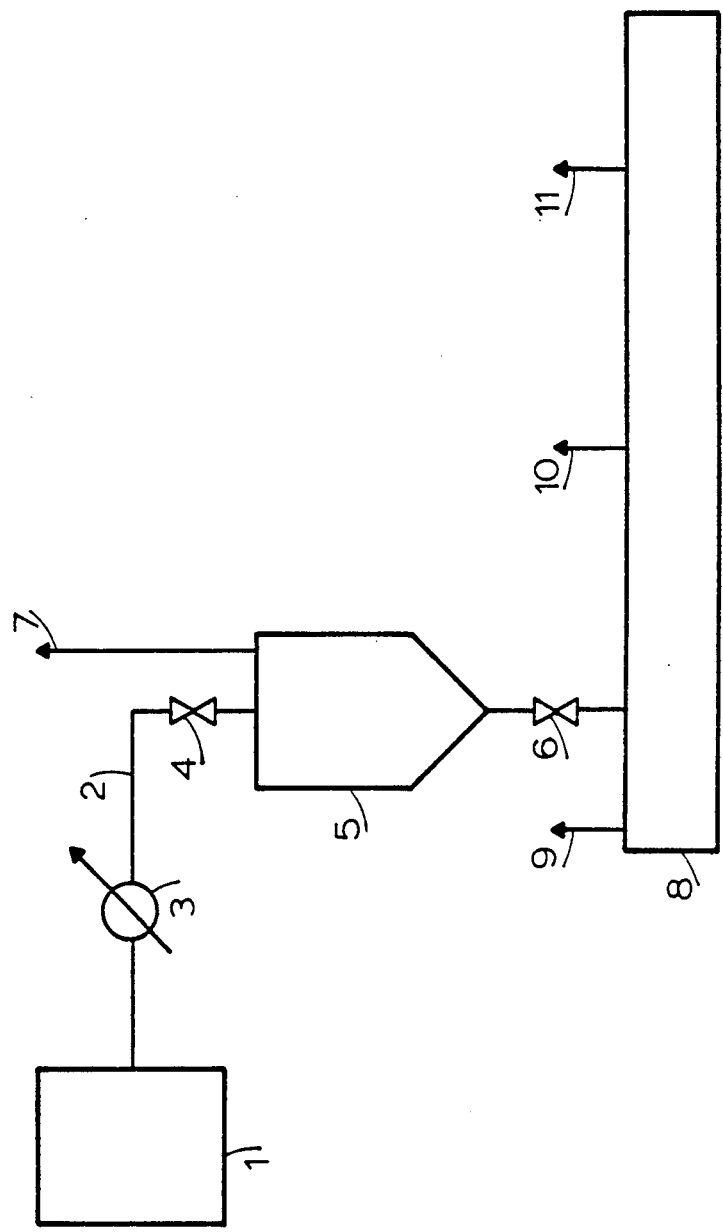

United States Patent [19]

Nagtzaam et al.

[11] Patent Number: 4,686,279

[45] Date of Patent: Aug. 11, 1987

[54] DEVICE AND PROCESS FOR RECOVERING POLYMER FROM A SOLUTION

[75] Inventors: Nicolaas P. Nagtzaam, Sittard; Cornelis Bronke, Geleen; Albert J. H. Brasz, Munstergeleen, all of Netherlands

[73] Assignee: Stamicarbon B.V., Geleen, Netherlands

[21] Appl. No.: 838,432

[22] Filed: Mar. 10, 1986

Related U.S. Application Data

[63] Continuation of Ser. No. 696,499, Jan. 30, 1985, abandoned, which is a continuation of Ser. No. 523,767, Aug. 17, 1983, abandoned.

[30] Foreign Application Priority Data

Aug. 21, 1982 [NL] Netherlands .................. 8203821

[51] Int. Cl.$^4$ ............................................. C08F 6/12
[52] U.S. Cl. .................................... 528/501; 425/203
[58] Field of Search .................................. 528/501

[56] References Cited

U.S. PATENT DOCUMENTS

| 3,506,640 | 4/1970 | Reid et al. | 528/501 X |
| 3,963,558 | 6/1976 | Skidmore | 425/203 X |
| 4,093,795 | 6/1978 | Buechner et al. | 528/501 X |
| 4,169,929 | 10/1979 | Buechner et al. | 528/501 X |

FOREIGN PATENT DOCUMENTS

| 27700 | 4/1981 | European Pat. Off. | |
| 68561 | 1/1983 | European Pat. Off. | 425/203 |

OTHER PUBLICATIONS

"New Applications for Twin-Screw Extruders", D. Gras, Plastics Design & Processing, Aug. (1972), pp. 24-29.
"Principles of Polymer Processing", Tadmor et al., (1979), pp. 121-122.

*Primary Examiner*—Paul R. Michl
*Attorney, Agent, or Firm*—Cushman, Darby & Cushman

[57] ABSTRACT

The invention relates to a device and a process for recovering polymer from a melt or solution containing volatile components. The device consists of an evaporating zone passing, via a metering device, which can function also as a pressure-reducing device, into a devolatilizing extruder. The metering and pressure-reducing device makes it possible also to process highly viscous melts of high-molecular polymers and to fill the extruder screws incompletely so that substantial devolatilization is realized in the extruder.

8 Claims, 1 Drawing Figure

DEVICE AND PROCESS FOR RECOVERING POLYMER FROM A SOLUTION

This is a continuation of application Ser. No. 696,499, filed Jan. 30, 1985, now abandoned, which is a continuation of application Ser. No. 523,767, filed Aug. 17, 1983, now abandoned.

The present invention relates to a device for recovering polymer from a melt or solution containing volatile components, which device consists of an evaporating zone with a feed for polymer melt or solution, a vent for volatile components, such as solvent and monomer(s), and a discharge for polymer melt or concentrated solution to an extruder. The invention also relates to a process for recovering polymer from a melt or a solution containing volatile components, which melt or solution contains or may contain also unconverted monomer(s), by feeding the melt or solution into an evaporating zone, in which most of the solvent and monomer(s) evaporates and is discharged, and passing the melt, respectively the concentrated solution, from the evaporator into an extruder and processing it in a manner known per se to form a granulate.

The preparation of polymers, particularly of polyolefins, more particularly the preparation of homo- and copolymers of ethylene, can be effected in the absence of a solvent, as so-called gas phase polymerization, and in the presence of a solvent, as supension polymerization, or as solution polymerization. The polymerization of ethylene can be effected also under high pressures in the absence of solvents with radical-forming agents as catalysts. In suspension or solution polymerization and in high pressure ethylene polymerization the polymer is recovered by separating off solvent and/or monomer(s).

According to a process known in the art (see report 19B of Stanford Research Institute page 143-160) ethylene (co)polymers prepared according to a solution polymerization are recovered by passing the (co)polymer solution into a number of evaporating zones (flash vessels) connected in series, in which solvent as well as unconverted monomer(s) are largely separated from the polymer by evaporation. From the final evaporating zone the polymer melt or concentrated solution is passed into an extruder and processed to form a granulate.

That process and other known processes for recovering a polymer, particularly an ethylene(co)polymer, have a number of disadvantages. First of all they are rather laborious and simplification is desirable. Fewer processing steps make the upgrading simpler, more effective and cheaper. The cost of the investment in equipment, too, will then be lower. Moreover, the applicability of the above-mentioned and other processes known in the art is rather limited. The viscosity of the melt or of the concentrated solution increases as the molecular weight increases, and as the molecular weight is higher or the melt index (ASTM D-1238) lower, the outflow from the evaporating zone, from which a melt or concentrated solution flows to an extruder with granulator, will be worse. In order to eventually obtain granulate having sufficiently low proportions of volatile components, a reduced pressure must often be maintained in the final evaporating vessel for the purpose of properly evaporating volatile components. Pressures of some tens of mm of mercury to about 10 mm of mercury or even lower have been suggested. Substantial evaporation involves a stronger decrease in the temperature of the melt than less substantial evaporation (heat of evaporation volatile components), as a result of which the viscosity of the melt or concentrated solution increases, and as the molecular weight increases outflow difficulties will be encountered sooner. In order to limit the evaporation of volatile components and consequently the decrease in temperature, the pressure of the final evaporating vessel is not reduced. In that case, too, the outflow will be worse as the molecular weight increases and eventually be unacceptably slow. In order to carry off more volatile components now, it is suggested in the European patent application No. 27700 to supply an inert stripping gas for the evaporating zone (flash vessel). Owing to the supply of this stripping gas, the evaporating surface will be increased, enabling a larger quantity of volatile components to escape. It is difficult for volatile components to evaporate from such viscous systems, even though temperature and pressure are such that in a non-viscous solution the evaporation would be rapid. That is why in this process the creation of a large surface is important. From this application it is known also that a higher preheating of the polymer solution will result in thermal decomposition and in gel formation, so that this does not provide a solution for the existing problems either. This process therefore does not provide a solution for upgrading high-molecular polyethylene.

For economic reasons and for reasons of environmental hygiene the requirements regarding the permissible quantities of volatile components in granulate of ethylene(co)polymers are made increasingly severe. The removal of volatile components does not always proceed very smoothly. When ethylene is homopolymerized, only solvent and ethylene must be driven out. The volatile ethylene can easily be removed in the evaporating zone (flash vessel) and optionally in devolatilizing sections of an extruder. According as it is more volatile, the solvent, too, will be easier to remove. If copolymers are to be prepared, and in the past few years there has been a strongly growing interest in ethylene(co)polymers, particularly in the so-called linear low density polyethylene (LLDPE), it will be more difficult for the comonomer to be removed from the polymer as the molecular weight of the comonomer increases and, consequently, the volatility decreases and as a larger quantity of comonomer is used. Either copolymer granulate is then obtained with too high a content of volatile components or laborious purfication processes must be applied. This will have to be taken into account particularly in so far as the said LLDPE is concerned, in respect of which higher comonomers, such as hexene or octene, or possibly even higher olefins, are preferred and these are used in larger quantities compared with earlier copolymers.

There is a definite want now of a universal upgrading process that can be applied to upgrade solutions of polymers, particularly of polyethylene, with relatively low molecular weights in volatile solvents, as well as solutions of ethylenepolymers with high molecular weights, for instance melt indices lower than 1, in less volatile solvents, as well as copolymers with relatively large quantities of higher comonomers, such as hexene, octene or higher, the molecular weights of which may also be high, to form granulate with low percentages of volatile components. Generally the content of volatile components must be lower than 1000 ppm, preferably lower than 250 ppm and more specifically lower than 50 ppm.

It has now been found that polymers with a very low content of volatile components, specifically ethylene(co)polymers from a solution that may, in addition to solvent, also contain monomer(s), can be recovered by passing the solution into an evaporating vessel in which most of the volatile components evaporates from the solution and is carried off, and passing the resulting melt or concentrated solution from this evaporator into an extruder and processing it in a manner known per se to form granulate by—and this characterizes the invention—passing the concentrated solution or melt from the evaporating zone into a devolatilizing extruder under atmospheric or reduced pressure, using a metering device across which a pressure difference may be maintained, and in this process setting the metering of the polymer and the speed of the extruder so that the extruder screw(s) in the feed section is (are) filled incompletely.

In the extruder into which the polymer melt or concentrated solution is fed preference is given to backward devolatilization.

Generally atmospheric or near-atomspheric pressure will be maintained in the feed of the extruder, particularly if backward devolatilization is applied. Small deviations from the atmospheric pressure, up to for instance 0.1 atm, are possible and are included. Feeding may be effected also under clearly reduced pressure, but in case of backward devolatilization sealing provisions will then be required, which are generally not sufficiently set off by advantages, and for this reason preference is given to atmospheric or near-atmospheric pressure. Thus a difference in pressure between evaporating zone and extruder feed is used as driving force to feed the concentrated solution or melt via the metering device into the extruder.

The invention also relates to a device for recovering polymer from a melt or solution containing volatile components, which device consists of an evaporating zone with a feed for polymer melt or solution, a vent for volatile components and a discharge for polymer melt or concentrated polymer solution to an extruder and, in the discharge from evaporating zone to extruder, a metering device that can function also as a pressure-reducing device, the extruder being provided with one or more devolatilizing sections.

The device according to the invention is compact and effective and makes it possible to recover polymer efficiently. Moreover, the device according to the invention is suitable for universal use and can be applied for recovering polymers varying in melt viscosity from melts or solutions with varying percentages of volatile components varying in volatility.

The device and process according to the present invention are particularly suited for the recovery of polymers, particularly ethylene(co)polymers having a high molecular weight, for instance ethylene(co)polymers having a melt index (ASTM D-1238 cond. E) lower than 2, more specifically lower than 1, and are even suited for the recovery of ethylene(co)polymers having a melt index of a few tenths and to a few hundredths or even lower.

The melt of such high-molecular ethylene(co)polymers is so viscous that, without metering device across which a difference in pressure is maintained, there will be no or insufficient outflow. By maintaining a difference in pressure between the evaporating zone and the extruder feed a proper outflow of the polymer melt or concentrated polymer solution is achieved. The average person skilled in the art can easily determine by experiment the fall in pressure required to ensure a good outflow of the polymer melt. This fall in pressure is substantially determined by the viscosity of the polymer melt or concentrated solution, and this viscosity in its turn depends on molecular weight, temperature and to a less degree on the content of volatile components. For the rest the pressure is not critical, although it will be kept as low as possible in order to be able to evaporate a maximum amount of volatile components. The chosen pressure will therefore generally be high enough to ensure a good outflow of the polymer melt, but not or only little higher. The fact is that higher pressures will result in a reduced evaporation of the volatile components so that more components will then have to be evaporated in the extruder. In general the intention is exactly to evaporate as small a quantity of volatile components in the extruder as possible. In addition to maintaining a pressure drop in the processing of high-molecular material, the metering device aims at effecting a metered supply of the polymer melt or concentrated polymer solution to the extruder.

The quantity of polymer melt fed into the extruder will then be independent of the speed of the extruder screw (screws), of the polymer flow and of the pressure drop. There are always variations in the polymer flow, but these are now levelled out. Without metering device the polymer flow would be dependent of the pressure drop, and only at a certain pressure, depending on circumstances like viscosity, polymer flow rate, would the evaporating zone be neither filled nor emptied. The use of the metering device makes it possible to operate independently of the pressure in the evaporating zone. It will also be clear that by using a metering device the quantity of polymer melt fed into the extruder is independent of the speed of the extruder screw (screws) and that at such an extrusion speed that the screws are filled incompletely the evaporating zone is not emptied and the pressure in that zone does not drop out. The chosen speed of rotation and, of course, the chosen dimensions of the extruder must be such that the quantity of polymer melt to be supplied can easily be processed. The incomplete filling of the extruder screw (screws) is necessary in order to properly remove volatile components from the polymer melt. Backward devolatilization in particular is unsatisfactory when the extruder screw(screws) is (are) filled completely. Now the degree of filling can be regulated by the speed of the extruder. Thus the final content of volatile components can be made to suit the requirements. As the extruder speed increases, the filling of the screws will be less and the shear in and kneading of the polymer melt will increase, so that the devolatilization will be more complete. Generally the extruder screw(s) is (are) filled to a maximum of 65% of the volume available, preferably not more than 50% and more specifically not more than 40%. A fill of about 30% is particularly effective. Lower fills may be applied, but offer hardly any added advantage. Thus a fill will generally not be lower than about 25%. The devolatilization of plastics in multi-screw extruders is otherwise known per se, for instance from Kunststoffe 71 (1981) 18–26.

The metering device, across which there may be a difference in pressure, may be a controllable valve, for instance, or any other known and suitable device.

Extruders have been known for long in many designs. Devolatilizing extruders, with or without backward devolatilization, are known also. In the present device a single-screw as well as a twin-screw extruder can be incorporated. Preference is given to applying a twin-screw extruder. Twin-screw extruders with co-rotating screws are self-cleaning, and the spread of the residence time is smaller than in single-screw extruders, so that a more homogeneous granulate is obtained. Owing to the narrow distribution of the residence time, the percentage of the material having long residence times is very small, and therefore the occurrence of gels and thermal decomposition can be ignored. The twin-screw extruder preferably has co-rotating screws.

The present process and the present device can be used for recovering a variety of polymers but are particularly suited for recovering polyolefins, particularly polyethylene or copolymers of ethylene, though the invention is not limited thereto and other olefin polymers, for instance elastomeric olefin copolymers, can be recovered as well. The present process and device are particularly suited for recovering ethylene copolymers containing relatively large quantities of higher comonomers. The LLDPE mentioned earlier is perferably a copolymer of ethylene with olefins having at least 4 carbon atoms, for instance with butylene, hexene, 4-methylpentene-1, octene, decene, dodecene, etc. The density of such LLDPE is lower than 0.935 and to this end relatively large quantities of the comonomer have to be incorporated by polymerization, at least substantially more than in the so far customary copolymer grades having densities of at least 0.940, which generally contain only relatively small quantities of propylene or butylene.

In the solution polymerization of ethylene, with or without one or more α-olefins having at least 3 carbon atoms, solutions are mostly obtained containing 15-20% by weight polymer. Lower concentratiosn are, of course, possible without objection, but for these larger quantities of solvent and larger reactors are required, which is uneconomic. With higher concentrations the viscosity of the solution increases and is apt to be so high that it will be difficult to stir the contents of the reactor and, moreover, a good deal of energy will be required for the stirring. The viscosity, of course, depends not only on the concentration, but also on the reactor temperature and on the molecular weight of the polymer. The concentration, therefore, is not a critical factor. The most favorable concentration is determined in dependence of the circumstances.

A solution obtained in such a polymerization process can be fed direct into the evaporating zone of the device according to the invention, but the solution can first be concentrated in a separate preposed evaporating zone and then be fed into the evaporating zone of the device according to the invention.

In the feed to the evaporataing zone a valve is incorporated for the purpose of maintaining the pressure in the polymerization reactor. Valves and/or pressure regulating devices will be present in the lines also if a pre-evaporating zone is used. Anyone skilled in the art can, without problems, make the necessary provisions for the pressure control, and this point will not be considered in further detail here. It is often desirable for the polymer solution to be heated before feeding it into the evaporating zone. A heater will then be placed before the upgrading device according to the invention. It will be quite evident to the person skilled in the art that for the proper functioning of the device according to the invention the polymer solution must be brought to a certain minimum temperature before being fed into the evaporating zone. The level of this temperature depends on a number of factors, such as kind of solvent, quantity and nature of remaining comonomers, polymer concentration, and the like, and it is not possible, therefore, to give certain values in this connection, but anyone skilled in the art will be able to determine without any trouble a usable temperature range on the basis of the prevailing circumstances. Of course, the chosen temperature must not be so high as to result in polymer degradation and/or gel formation.

The quantities of solvent and monomer(s) evaporated in the evaporating zone may vary within wide limits. As the evaporation in the evaporating zone increases, the evaporation in the extruder may be less and vice versa. It will also be understandable that polymer melt and concentrated polymer solution are concepts that overlap one another. The polymer mass that must be upgraded is a mixture of polymer, solvent and monomer(s). As the evaporation of solvent and monomer(s) therefrom proceeds, the mass will be regarded more as melt than as a solution, but there is no essential difference.

The quantities of solvent and monomer(s) to be evaporated in the evaporating zone are determined by factors like temperature and pressure. As the temperature is higher and the pressure lower, more volatile components (solvent and monomer(s)) will evaporate. The pressure in the evaporating zone must at least be so high that with the prevailing viscosity the outflow of the polymer melt to the extruder will be guaranteed. A pressure of at least 1.5 bar (0.5 bar gauge) is mostly desired. In processing polyethylene with a melt index of 2 or lower the pressure may be higher, often about 4-6 bar. For very high-molecular polymers whose melt or concentrated solution is very viscous even higher pressures may be applied. In doing so care should be taken that sufficient quantities of volatile components evaporate so that not too much will have to be evaporated in the extruder.

Now if ethylene with minor quantities of one or more α-olefins having 3-15 carbon atoms are polymerized in the presence of a catalyst known per se in a hydrocarbon solvent, e.g. hexane, heptane or light petrol with a boiling range of 60°-80° C., at a temperature of 175°-230° C., in reactor 1 (see FIGURE) to form an ethylene polymer having a melt index (ASTM D-1238) of 0.1-50 and a density of 0.935 or lower, in which process this ethylene polymer is obtained in an approx. 20%-(wt) solution, this ethylene polymer solution can be fed forthwith into an evaporating zone and part of the volatile components can be evaporated off to a polymer concentration of, for instance, 35-45%(wt). After that the solution must be heated to a temperature of 230°-290° C., for instance 260° C., upon which it is fed into an upgrading device according to the invention. The polymer solution can be fed also direct from reactor (1) through line (2) through product heater (3), valve (4) into evaporating vessel (5) according to the invention.

In it so much of the volatile components is evaporated that the concentration increases to 80-99%(wt) polymer. The volatile components are carried off through vent (7). The melted polymer mass can now be passed over a metering device (6) into an extruder (8) with backward devolatilization (9). By the expansion to about atmospheric pressure large part of the volatile components escapes. These are carried off by the backward vent. The polymer melt is further carried off by the extruder, which may incorporate one (10) or more (11) additional vents, so that a polymer melt may be obtained whose content of volatile components may be lower than 500 ppm. In these devolatilizing sections the filling of the extruder channel must be incomplete. In order to be able to influence the effectiveness of the devolatilization process, the temperature of the melt, the amount of shear, the residence time in the devolatilizing section and the filling of the extruder channel can usually be varied. The residence time the amount of shear and the filling of the extruder channel can be influenced, at a given flow rate, only by the geometry of the extruder and the speed of the extruder screw (screws). Once the extruder and the screw (screws) have been chosen, only the speed remains to serve as regulator. The quantity of polymer passed through the extruder per unit of time is jet with metering device (6). A change in the extruder speed then influences the degree to which the screw (screws) is (are) filled, but not the quantity of polymer that is passed through.

The extruder feeds the polymer melt into a granulator in which the melt is processed to form granulate.

In the device according to the invention provisions known per se can be incorporated. thus it is known to reduce the content of volatile components of polymers by supplying in the extrusion process, a blowing gas or foaming agent. This can be done also in the present process and the extruder to be used may have the provisions required for this purpose. In the devolatilizing sections reduced pressure is mostly applied. For the granulation a pressure build-up is required now. This pressured build-up can be realized with an extrusion screw section, but, for instance, also with a gear pump installed after the final devolatilizing section. This is only by way of example, for there are a number of other possibilities suited to obtain the desired pressure build-up.

It will be clear that within the scope of the invention it will be possible to use a variety of modes of realizing the device and process described.

The invention is elucidated by means of the following example without being restricted by it.

EXAMPLE

In a device according to the invention, consisting of an evaporating zone (5) with feed for polymer solution (2), vent for volatile components (7), a discharge for the concentrated polymer solution, the throughput of which is set with a metering device (6), across which a difference in pressure can be maintained, and a twin-screw devolatilizing extruder (8) with a backward vent (9) and two forward vents (10 and 11), a solution of a copolymer of ethylene and octene in light petrol is fed into evaporating zone (5) at a rate of 1757 parts by weight/hour. The density of the ethylene-octene copolymer is 920 kg/m$^3$. The melt index (according to ASTM D-1238) is 1.1. The temperature of the solution is 240° C. The solution consists of 615 parts by weight of ethylene copolymer, 936 parts by weight of light petrol and 206 parts by weight of octene (unconverted comonomer). The pressure in the evaporating zone is 4.5 bar. From evaporating zone (5) a solution containing only 54 parts by weight of petrol and 22 parts by weight of octene is passed to the extruder at a rate of 691 parts by weight/hour. Just before metering device (6) the temperature is 215° C. This solution, resp. melt containing 11% (wt) volatile components, is further liberated from volatile components in the extruder. The degree to which the devolatilizing sections of the extruder are filled is 30%. The pressure in backward vent 9 is 1032 mbar, i.e. about as much as at the feed of the extruder, the pressure in the first forward vent (10) is 156 mbar, in the second forward vent (11) 24 mbar. The copolymer granulate that is eventually obtained contains 400 ppm petrol and 350 ppm (parts by weight per million) octene. Before the second vent (11) water may be injected. If 0.15% (wt) water calculated in respect of the ethylene copolymer throughput is fed, the content of volatile components in the ethylene copolymer granulate falls to 250 ppm petrol and 200 ppm octene.

We claim:

1. A process for recovering polymer from a solution containing volatile solvents, high molecular weight polymers having a melt index lower than 2 and unreacted monomers comprising the combination of:
   preparing the polymer solution containing solvents in a reactor;
   feeding the polymer solution from the reactor to at least one separate evaporating zone through a first valve means positioned upstream of the evaporating zone to control upstream pressure and evaporating sufficient solvent to produce a concentrated polymer solution having 80–99 percent weight polymer;
   maintaining pressure in the evaporating zone while feeding the concentrated polymer solution from the evaporating zone to a second valve means positioned downstream from the evaporating zone;
   feeding the concentrated polymer solution from the second valve means to the feed section of a devolatizing extruder under reduced pressure from the pressure in the evaporating zone and maintaining a pressure difference between the evaporating zone and the feed section of the extruder so that the pressure difference is used as the driving force to feed the concentrated polymer solution via the second valve means while simultaneously isolating the feed section from upstream evaporating zone pressures; and
   adjusting the operating speed of the extruder so that the feeding of the concentrated polymer solution will incompletely fill the extruder at the feed section of the extruder.

2. A process as in claim 1, wherein the reduced pressure in the feed section of the extruder is substantially atmospheric.

3. A process as in claim 1, including the further step of venting volatile solvent and monomer components from the feed section of said extruder.

4. A process as in claim 1, wherein the volume of the extruder will be filled from a minimum of about 25% to a maximum of about 65% of the extruder volume.

5. A process as in claim 4, wherein from about 30% to about 50% of the volume of the extruder is filled.

6. A process as in claim 1, wherein the recovered polymer has a density less than about 0.935.

7. A process as in claim 1, wherein the pressure maintained n the evaporating zone will vary from about 1.5 to about 6 BAR.

8. A process as in claim 1, wherein the pressure maintained in the evaporating zone is at least 1.5 BAR.

* * * * *

UNITED STATES PATENT AND TRADEMARK OFFICE
CERTIFICATE OF CORRECTION

PATENT NO. : 4,686,279

DATED : Aug. 11, 1987

INVENTOR(S) : NAGTZAAM ET AL

It is certified that error appears in the above-identified patent and that said Letters Patent is hereby corrected as shown below: On the title page Item (30) should read

[30] Foreign Application Priority Data

Aug. 21, 1982 [NL] Netherlands ................ 8203281

Signed and Sealed this

Fifth Day of January, 1988

Attest:

DONALD J. QUIGG

Attesting Officer

Commissioner of Patents and Trademarks